United States Patent [15] 3,678,295
Heneghan [45] July 18, 1972

[54] TRANSISTION SENSING CIRCUIT

[72] Inventor: Patrick J. Heneghan, Chicago, Ill.
[73] Assignee: Teletype Corporation, Skokie, Ill.

[22] Filed: Dec. 29, 1969
[21] Appl. No.: 888,731

[52] U.S. Cl. ..............................307/235, 307/232, 307/243, 307/260, 328/150
[51] Int. Cl. ......................................H03k 5/13, H03k 17/28
[58] Field of Search ..................307/235, 236, 238, 243, 260, 307/232, 269, 234; 328/108, 116, 117, 118, 150

[56] References Cited

UNITED STATES PATENTS

| | | | |
|---|---|---|---|
| 3,333,205 | 7/1967 | Featherston | 328/77 X |
| 3,004,174 | 10/1961 | Seidman | 328/150 X |
| 3,226,650 | 12/1965 | Higbie | 307/235 X |
| 3,293,553 | 12/1966 | Brown, Jr. | 328/146 X |
| 3,330,973 | 7/1967 | Clapper | 307/236 X |
| 3,479,603 | 11/1969 | Overstreet, Jr. | 307/204 X |

OTHER PUBLICATIONS

Brenner & Javid, " Analysis of Electric Circuits," p. 166, McGraw-Hill Book Co. Copyright 1959, 1967.

*Primary Examiner*—John S. Heyman
*Assistant Examiner*—L. N. Anagnos
*Attorney*—J. L. Landis and R. P. Miller

[57] ABSTRACT

A transition sensing circuit, which normally provides a first output, provides a second output for a predetermined duration whenever the input to the circuit changes from an input of a first type to an input of a second type, or vice versa. When the input to the circuit changes from an input of the first type to an input of the second type, the second output is obtained from the circuit for the time required to charge a first capacitor to a voltage sufficient to overcome the forward breakdown voltage of a diode. When the input to the circuit changes from an input of the second type to an input of the first type, the second output is obtained from the output of the circuit for the time required to discharge a second capacitor to a predetermined voltage.

20 Claims, 2 Drawing Figures

INVENTOR
PATRICK J. HENEGHAN
BY J. J. Landis
ATTORNEY

TRANSISTION SENSING CIRCUIT

BACKGROUND OF THE INVENTION

The present invention relates to voltage transition responsive circuits, and in particular to a circuit for determining when there has been a change in a signal level on a telegraph line.

In monitoring telegraph lines to determine whether there has been a change in the signal level on the line, there is a need for voltage transition responsive circuits. It is often desirable, for example, to determine when a marking signal on the telegraph line changes to a spacing signal, or vice versa, for the purpose of determining when there has been a change in the information being presented on a telegraph line, or to determine when a particular binary character has begun or has ended.

An object of the invention is to provide a voltage transition sensing circuit wherein an output is provided from the circuit whenever the input to the circuit changes from a first signal level to a second signal level, or vice versa.

SUMMARY OF THE INVENTION

The foregoing and other objects of the invention are accomplished by providing a first step or means, responsive to a change in the input signal to the circuit, for producing an intermediate signal that is a delayed representation of the input signal. A second step or means is provided, responsive to the input signal and to the intermediate signal, for producing a first output when the input signal and the intermediate signal differ, and for pro-ducing a second output when the input signal and the intermediate signal are the same.

Preferably, first and second amplifiers are provided, the output of the first amplifier being connected through the second amplifier to the output of the second amplifier. First and second resistor-capacitor networks are connected as integrating networks in the input circuits to the first and the second amplifiers, respectively, one plate of each capacitor in each resistor-capacitor network being connected to a common point of potential. First and second diodes are provided in the input circuit to the first amplifier, the first diode being connected with its cathode to the input of the circuit, and in parallel with the resistor in the first resistor-capacitor network, so that it is reversed biased when a positive signal is applied to the input of the circuit. The second diode is connected between the first resistor-capacitor network and the input to the first amplifier, with its cathode connected to the input of the first amplifier, such that it is forward biased when a positive signal is applied to the input of the circuit. A third diode is provided in the input circuit to the second amplifier between the input to the circuit and the second resistor capacitor network, with its anode connected to the input of the circuit, such that it is forward biased when a positive signal is applied to the input of the circuit. When the input of the circuit changes from a ground to a positive potential, an output is provided by the circuit for the time required for the capacitor in the first resistor-capacitor network to charge to a voltage sufficiently positive to overcome the forward breakdown voltage of the second diode, and to allow it to conduct. When the input to the circuit changes from a positive potential to a ground potential, an output is provided by the circuit for the time required for the capacitor in the second resistor-capacitor network to discharge sufficiently to prevent conduction of the second amplifier.

Other objects, advantages and features of the invention will be apparent from the following detailed description of specific embodiments thereof, when taken in conjunction with the appended drawings.

DETAILED DESCRIPTION

Figure 1:
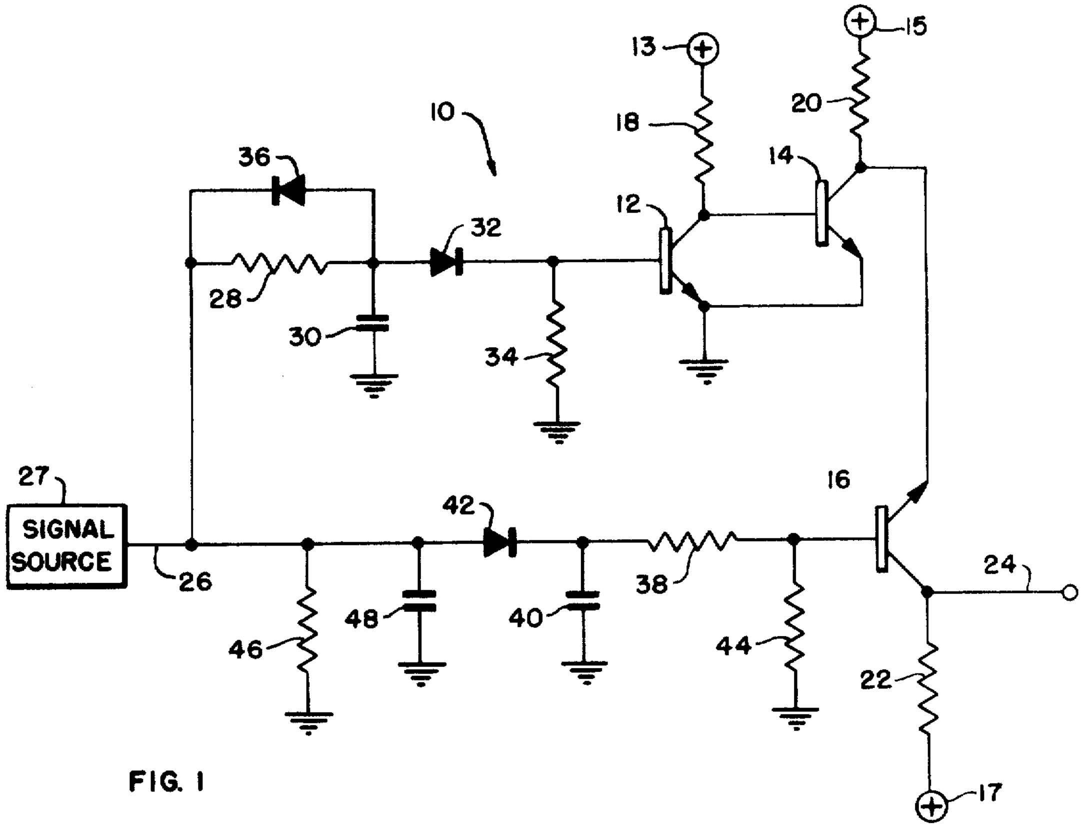
FIG. 1 is a circuit diagram of a preferred embodiment of the invention.

Referring now to FIG. 1 of the drawings, there is shown a voltage transition sensing circuit particularly adapted for operation as a signal transition sensing circuit used in conjunction with a telegraph signal line. In the description of the operation of the circuit shown in the drawing, reference will be made to positive and to ground potentials. These terms for defining the potentials used in the circuit are relative terms used to illustrate the operation of the circuit and are not to be considered limiting, since any other two potentials could be used, the potential being substituted for the positive potential referred to in the specification being merely more positive than the potential being substituted for the ground potential.

The specific embodiment of the voltage transition sensing circuit 10 includes three slicing amplifiers in the form of three NPN transistors 12, 14 and 16, the collectors of the three transistors being connected to a source of positive potential at points 13, 15 and 17, by three collector resistors 18, 20 and 22, respectively. The two transistors 12 and 14 are connected to function as an inverter, the collector of the transistor 12 being connected to the base of the transistor 14, and the emitters of both the transistors 12 and 14 being connected to a source of ground potential, so that when the transistor 12 is rendered conductive by a positive signal at its base to provide a ground potential at its collector, the transistor 14 will be rendered nonconductive, to provide a positive potential at its collector and so that when the transistor 12 is rendered nonconductive by a ground signal at its base to provide a positive potential at its collector, the transistor 14 will be rendered conductive to provide a ground potential at its collector. The collector of the transistor 14 is connected to the emitter of the transistor 16, the collector of which provides an output 24 for the circuit 10, so that when both the transistors 14 and 16 are rendered conductive the ground potential at the emitter of the transistor 14 will be carried through the transistors 14 and 16 to the output 24 of the circuit 10, the transistor 16 being rendered conductive by a positive signal at its base. Whenever either transistor 14 or 16 is nonconductive, a positive potential will be provided by the collector resistor 22 to the output 24 of the circuit 10.

Since a ground potential is provided at the output 24 of the circuit 10 only when both of the transistors 14 and 16 are conducting, it is necessary to have both a ground potential at the base of the transistor 12 and a positive potential at the base of the transistor 16 to obtain a ground output from the circuit 10. This is accomplished with the use of two resistor-capacitor networks, connected as integrating networks, in series between an input 26 of the circuit 10 and the base inputs of the transistors 12 and 16, the input 26 being connected to a desired source 27 of signals to be monitored. The first network is comprised of a resistor 28 and a capacitor 30, one terminal of the resistor 28 being connected to the input 26 of the circuit 10, and the other terminal of the resistor being connected to one plate of the capacitor 30 and to the anode of a diode 32, the other plate of the capacitor 30 being connected to a source of ground potential. The cathode of the diode 32 is connected to the base of the transistor 12, and to a source of ground potential through a base resistor 34. A shunting diode 36 is connected in parallel with the resistor 28, such that it will be reverse biased if a positive potential is applied at the input 26 of the circuit 10.

The second resistor-capacitor network is comprised of a resistor 38 and a capacitor 40, and is connected in series with the base circuit of the transistor 16. One of the resistor 38 is connected to a plate of the capacitor 40 and to the cathode of a diode 42, the other plate of the capacitor 40 being connected to a source of ground potential. The other terminal of the resistor 38 is connected to the base of the transistor 16, and to a source of ground potential through a base resistor 44. The anode of the diode 42 is connected to the input 26 of the circuit 10 and to a conventional filter network comprised of a resistor 46 and a capacitor 48.

OPERATION

Figure 2:
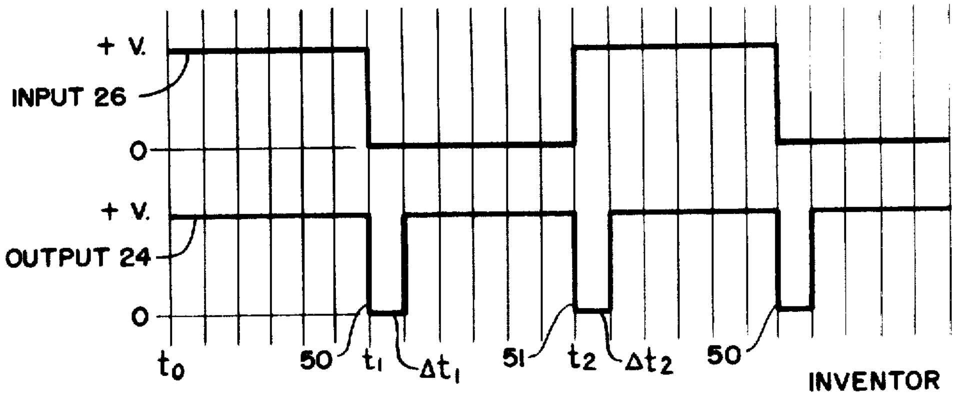
FIG. 2 is a timing diagram showing the relationship between the input to the circuit and the output obtained therefrom.

Referring now to FIG. 2, the transition-sensing circuit 10 is designed to produce an output pulse 50 (ground in the example) lasting a predetermined time $\Delta t_1$ after the input 26 from signal source 27 switches from + V (marking) to ground (spacing), such as is shown commencing at a time $t_1$. Similarly, the circuit produces a corresponding output pulse 51 lasting a corresponding time $\Delta t_2$ after the input 26 switches from ground to + V, such as is indicated at a time $t_2$.

To follow the operation, commencing at time $t_0$ in FIG. 2, when a positive potential (+ V) has been applied to the input 26 of the circuit 10, the transistor 12 is forward biased into con-duction through the resistor 28 and the diode 32. The positive potential (+ V) is equal to the positive potential obtained at the points 13, 15 and 17. Conduction of the transistor 12 provides a ground potential at the base of the transistor 14, thereby rendering the transistor 14 nonconductive and allowing a positive potential from source 15 to be applied to the emitter of the transistor 16 through the collector resistor 20. The positive potential at the input 26 is also applied through the diode 42 and the resistor 38 to the base of the transistor 16. However, as a result of the voltage divider effect obtained by the two resistors 38 and 44, the emitter of the transistor 16 will be more positive than the base, and the base-emitter junction of the transistor 16 will be reverse biased. Therefore, the transistor 16 will not conduct, and a positive potential, supplied through collector resistor 22, will be provided at the output 24 of the circuit 10, as shown in FIG. 2 of the drawings. It is to be noted that, while the positive potential is available, at the input 26 of the circuit, the two capacitors 30 and 40 will be charged to a positive potential.

At time $t_1$, the signal applied from the source 27 to the input 26 of the circuit 10 is brought to a ground potential. As a result of a ground potential at the input 26 the capacitor 30, which had been charged to a positive potential, is immediately discharged through the diode 36 to the ground potential at the source 27, and the transistor 12 is rendered nonconductive. When the transistor 12 is rendered nonconductive, the positive potential from source 13, obtained through the collector resistor 18, is applied to the base of the transistor 14, rendering it conductive and allowing it to supply the ground potential at its emitter to the emitter of the transistor 16.

The positive potential at the capacitor 40, however, is prevented from discharging to the ground potential at the input 26 by the diode 42, which is now reverse biased, but instead forward biases the transistor 16, the emitter of which is now less positive than the base, through the resistor 38, thereby allowing the transistor 16 to conduct and to carry the ground potential being presented to its emitter, through the transistor 14, to the output 24 of the circuit, as shown in FIG. 2, to provide the first output pulse 50. The ground potential at the output 24 is maintained until the positive charge at the capacitor 40 is sufficiently discharged through the base resistor 44 and the base junction of the transistor 16 so as to be unable to maintain forward conduction of the transistor 16, at which time a positive potential will again be provided at the output 24 of the circuit 10 through the collector resistor 22. This determines the time interval $\Delta t_1$ of the output pulse 50.

While the ground potential remains at the input 26 of the circuit 10, (until a later time $t_2$ when the signal source 27 switches back to + V volts), the transistor 14 will continue to be forward biased and will continue to provide a ground potential at the emitter of the transistor 16. The transistor 16, however, will remain nonconductive once the positive potential on the capacitor 40 has been dissipated, and the positive potential from source 17 will continue to appear at the output 24 of the circuit 10. At the time $t_2$, the signal at the input 26 of the circuit, changes from a ground to a positive potential. When this occurs, the positive potential at the input 26 will be applied through the now forward biased diode 42 and the resistor 38, to the base of the transistor 16, rendering the transistor 16 conductive and allowing it to provide the ground potential at its emitter to the output 24. This provides the second output pulse 51, at time $t_2$. The positive potential will also be applied through the resistor 28 to the capacitor 30, which will immediately begin to charge to a positive potential, the diode 36 being reverse biased in this case. When the positive potential on the capacitor 30 exceeds the forward voltage breakdown of the diode 32, which defines the time interval $\Delta t_2$, the diode 32 conducts and forward biases the transistor 12 into conduction, thereby rendering the transistor 14 nonconductive as described above. When the transistor 14 becomes nonconductive, the ground potential is removed from the emitter of the transistor 16, and instead a positive potential from source 15 is applied to the emitter of the transistor 16 through the collector resistor 20. With a positive potential at the emitter of the transistor 16, the base-emitter junction of the transistor 16 is reverse biased as described above, and the transistor 16 becomes nonconductive, thereby again allowing a positive potential from source 17 to be provided at the output 24 through the collector resistor 22. The circuit is now ready to provide another ground potential at the output 24, as described above, when a negative signal is again applied to the input 26, at some time after $t_2$.

It is to be observed that (1) the discharge time of the capacitor 40 through the base resistor 44 and the base junction of the transistor 16 to a potential sufficiently low so as to render the transistor nonconductive when the signal applied to the input 26 changes from a positive to a ground potential, and (2) the charge time of the capacitor 30 to a potential sufficiently positive to overcome the forward breakdown voltage of the diode 32 when the input to the circuit 10 changes from a ground to a positive potential, determine the respective time intervals $\Delta t_1$ and $\Delta t_2$ for which the ground potential pulses 50 and 51 are obtained at the out-put 24 of the circuit 10, whenever a transition occurs at the input 26 of the circuit.

While one specific embodiment of the invention has been described in detail, it will be obvious that various modifications may be made from the specific details described without departing from the spirit and scope of the invention.

What is claimed is:

1. A circuit for providing output signals in response to changes in the signal level of a received input signal, which comprises:
   - means responsive to changes in the input signal for producing an intermediate signal including delayed representations of the input signal; and
   - gating means, having a first and a second switchable state and responsive to the input signal and the intermediate signal, switchable to said first switchable state for producing a first output when the input signal and the intermediate signal differ and switchable to said second switchable state for producing a second different output at all times when the input signal and the intermediate signal are the same.

2. A circuit as recited in claim 1, wherein the intermediate signal producing means includes at least one capacitor.

3. A voltage transition responsive circuit for providing an output signal in response to a change in the signal level of a received input signal, which comprises:
   - first and second storage devices having inputs and outputs wherein the input signal is applied to the input of each storage device and wherein said first storage device output provides a delayed representation of the input signal differing from said second storage device output when the input signal level changes; and
   - gating means, responsive to the outputs from the storage devices, for providing a first output when the relationship between the outputs from the storage devices differs and a second output otherwise.

4. A circuit as recited in claim 3, wherein the first and second storage devices include first and second capacitors.

5. A circuit as recited in claim 4, wherein the first and second storage device output signals are within first and second ranges of voltages.

6. A circuit as recited in claim 5, wherein:

the gating means provides the first output in response to an increase in the signal level of the received input signal for a time required to charge the first capacitor to a predetermined potential; and the gating means also provides the first output in response to a decrease in the signal level of the received input signal for a time required to discharge the second capacitor to a predetermined potential.

7. A voltage transition responsive circuit for providing an output signal in response to a change in the signal level of a received input signal, which comprises:

first and second storage devices having inputs and outputs, wherein the input signal is applied to the input of each storage device and wherein both a first type of signal is provided at the output of the first storage device and a second type of signal is provided at the output of the second storage device only when the level of the input signal changes;

a first amplifier, responsive to the output of the first storage device, for providing a first output only in response to the first type of signal at the output of the first storage device and for providing a second output otherwise; and a second amplifier, responsive to the output of the second storage device and the output of the first amplifier, for providing a first output only in response to both the second type of signal at the output of the second stage device and to the first output at the first amplifier, so that the first output from the second amplifier indicates a change in the signal level of the input signal.

8. A circuit according to claim 7, wherein the first and second storage device output signals are within first and second voltage ranges.

9. A circuit as recited in claim 7, wherein the output of the first amplifier is connected through the second amplifier to the output of the second amplifier.

10. A voltage responsive circuit as recited in claim 9, further including:

an input to the circuit;

a resistor, connected between the first storage device and the input;

a first diode, having its anode connected to the first storage device and its cathode connected to the input;

a second diode, having its anode connected to the first storage device and its cathode connected to the first amplifier; and a third diode, having its anode connected to the input of the circuit and its cathode connected to the second storage device.

11. A circuit as recited in claim 10, wherein:

both the first and the second storage devices are capacitive storage devices;

the input signal is provided to a first plate of both the first and the second capacitive storage devices; and the second plates of both the first and the second capacitive storage devices are connected to a common point of potential.

12. The circuit as recited in claim 11, wherein both the first and the second amplifiers are transistors.

13. A circuit as recited in claim 12, wherein:

the first amplifier provides the first output in response to an increase in the signal level of the received input for the time required to charge the first capacitive storage device to a potential equal to the forward breakdown voltage of the second diode; and the second amplifier provides the first output in response to a decrease in the signal level of the received input for the time required to discharge the second capacitive storage device to a predetermined potential.

14. A method of providing an output from a circuit in response to a change in the signal level of a received input, which comprises:

delaying a change in the signal level of the received input to provide a delayed representation thereof;

applying the changed signal level and the delayed representation thereof to a gating means, said gating means switchable into a first and a second switchable state; and providing a first output from said gating means while said gating means is in said first switchable state when the changed signal level and the delayed representation thereof differ, and providing a second different output from said gating means while said gating means is in said second switchable state at all times when the changed signal level and the delayed representation thereof are the same.

15. A method as recited in claim 14, wherein delaying a change in the input signal level comprises applying the signal to one plate of an integrating capacitor.

16. A method as recited in claim 15, wherein the applying step comprises:

applying the delayed representation of the changed input signal to a first gate;

applying the changed input signal to a second gate; and connecting the output of the first gate to the second gate, so that the output of the first gate may be provided at the output of the second gate whenever the changed input signal and the delayed representation thereof differ.

17. A method as recited in claim 15, for providing the output for a predetermined time, further comprising charging the capacitor with the input signal to a potential sufficient to overcome the forward breakdown voltage of a diode.

18. A circuit for providing an output signal of one polarity in response to each transition in the level of an input signal, the transitions being alternately in positive-going and negative-going directions, which comprises:

a first switch means having first and second operative states arranged to switch from the first state to the second state when a transition in a first of the two directions occurs in the input signal;

means for delaying the first switch means from switching from the second to the first state for a first predetermined time after a transition in a second of the two directions occurs in the input signal;

a second switch means having first and second operative states and being responsive to the states of the first switch means and to the transitions in the level of the input signal, for switching to the first state in response to a transition in the input signal in the second of the two directions, for switching to the second state in response to the first switch means switching to the first state at the first predetermined time after the transition in the second of the two directions, and for switching, again, to the first state in response to the first switch means switching to the second state when a transition in the first direction occurs in the input signal;

means for maintaining the second switch means in the first state for a second predetermined time after the transition in the first direction; and means coupled to the second switch means for generating the output signal of one polarity when the second switch means is in the second state.

19. A circuit for providing an output signal in response to transitions in potential of a signal input consisting of first and second signal levels the first signal level being of more positive potential with respect to the second signal level, which comprises:

first means responsive to the signal input for generating a first modified signal having delayed transitions from the less positive to the more positive potential;

means for inverting the modified signal, coupled to the first generating means;

second means responsive to the signal input for generating a second modified signal having delayed transitions from the more positive potential to the less positive potential; and means having first and second signal input terminals coupled to the inverting means and to the second generating means, respectively, for providing an output signal of a first potential when both the first and the second signal inputs receive the more positive of the two signal levels and for providing an output signal of a second potential when at least one of the signal inputs receives the less positive of the two types signal levels.

20. A method of generating output signals at an output terminal in response to transitions in input signals from a more positive to a less positive potential and from the less positive to the more positive potential, which comprises:

delaying for a first predetermined length of time transitions from the less positive potential to the more positive potential to generate first modified input signals;

inverting the first modified input signals;

delaying for a second predetermined length of time transitions from the more positive potential to the less positive potential to generate second modified input signals;

comparing the inverted signals and the second modified signals with respect to move positive and less positive signal potentials; and generating output signals at the output terminal whenever both, the inverted signals and the second modified signals, are at a more positive signal potential.

* * * * *